(12) United States Patent
Cossu

(10) Patent No.: US 10,838,165 B2
(45) Date of Patent: Nov. 17, 2020

(54) PLENOPTIC ZOOM WITH OPTIMISED RANGE

(71) Applicant: THALES, Courbevoie (FR)

(72) Inventor: Kevin Cossu, Massy (FR)

(73) Assignee: THALES, Courbevoie (FR)

(*) Notice: Subject to any disclaimer, the term of this patent is extended or adjusted under 35 U.S.C. 154(b) by 0 days.

(21) Appl. No.: 16/064,418

(22) PCT Filed: Dec. 8, 2016

(86) PCT No.: PCT/EP2016/080178
§ 371 (c)(1),
(2) Date: Jun. 20, 2018

(87) PCT Pub. No.: WO2017/108417
PCT Pub. Date: Jun. 29, 2017

(65) Prior Publication Data
US 2019/0004283 A1  Jan. 3, 2019

(30) Foreign Application Priority Data
Dec. 23, 2015 (FR) ...................... 15 02681

(51) Int. Cl.
*G02B 7/28* (2006.01)
*G06T 7/557* (2017.01)
(Continued)

(52) U.S. Cl.
CPC ............ *G02B 7/282* (2013.01); *G02B 15/00* (2013.01); *G06T 7/557* (2017.01); *H04N 5/232* (2013.01);
(Continued)

(58) Field of Classification Search
None
See application file for complete search history.

(56) References Cited

U.S. PATENT DOCUMENTS

| 5,017,956 A | * | 5/1991 | Murata | ................ G03B 7/17 |
| | | | | 396/61 |
| 7,962,033 B2 | | 6/2011 | Georgiev et al. | |

(Continued)

FOREIGN PATENT DOCUMENTS

EP  2 244 484 A1  10/2010

OTHER PUBLICATIONS

C. Hahne, A. Aggoun and V. Velisavljevic, "The refocusing distance of a standard plenoptic photograph," 2015 3DTV-Conference: The True Vision—Capture, Transmission and Display of 3D Video (3DTV-CON), Lisbon, 2015, pp. 1-4. (Year: 2015).*

(Continued)

*Primary Examiner* — Stuart D Bennett
(74) *Attorney, Agent, or Firm* — BakerHostetler

(57) ABSTRACT

An optical system includes an objective of the zoom type and a depth-estimating optical detecting unit, the depth-estimating optical detecting unit including a matrix array of micro-lenses and a matrix-array detector, the matrix array of micro-lenses being arranged so that the image of the focal plane of the zoom is focused by the matrix array of micro-lenses on the plane of the matrix-array detector. The optical system calculates, for a first focal length of the zoom and for a given object, the estimated distance of this object and the measurement uncertainty in this estimation, depending on the first focal length and the estimated distance and, this estimated distance being known, optimizes by allowing at least one second focal length of the zoom to which a lower measurement uncertainty in this estimation corresponds to be determined.

9 Claims, 4 Drawing Sheets

(51) Int. Cl.
*G02B 15/00* (2006.01)
*H04N 5/262* (2006.01)
*H04N 5/232* (2006.01)

(52) U.S. Cl.
CPC ....... *H04N 5/23229* (2013.01); *H04N 5/2628* (2013.01); *G06T 2207/10048* (2013.01); *G06T 2207/10052* (2013.01)

(56) References Cited

U.S. PATENT DOCUMENTS

| | | | | |
|---|---|---|---|---|
| 2004/0245430 A1* | 12/2004 | Konishi | ................ | G02B 7/102 250/201.2 |
| 2005/0099523 A1* | 5/2005 | Konishi | ............. | H04N 5/23212 348/345 |
| 2010/0141802 A1* | 6/2010 | Knight | ................ | H04N 5/2254 348/240.3 |
| 2012/0287329 A1 | 11/2012 | Yahata | | |
| 2012/0300091 A1* | 11/2012 | Shroff | ................ | H04N 5/23212 348/222.1 |
| 2013/0235222 A1* | 9/2013 | Karn | ................... | H04N 5/23203 348/211.2 |
| 2013/0308035 A1 | 11/2013 | Hiasa et al. | | |

OTHER PUBLICATIONS

Lumsdaine, et al., "The Focused Plenoptic Camera", 2009 IEEE International Conference on Computational Photography (ICCP).

Perwab, et al., "Single lens 3D-camera with extended depth-of-field", Proc. SPIE 8291, Human Vision and Electronic Imaging XVII, 829108 (Feb. 17, 2012).

Lei, et al.,"An electrically tunable plenoptic camera using a liquid crystal microlens array", Review of Scientific Instruments, vol. 86, No. 5, pp. 053101-053108, (2015).

* cited by examiner

PLENOPTIC ZOOM WITH OPTIMISED RANGE

CROSS-REFERENCE TO RELATED APPLICATIONS

This application is a National Stage of International patent application PCT/EP2016/080178, filed on Dec. 8, 2016, which claims priority to foreign French patent application No. FR 1502681, filed on Dec. 23, 2015, the disclosures of which are incorporated by reference in their entirety.

FIELD OF THE INVENTION

The field of the invention relates to the field of imaging. More particularly, the field of the invention is that of imagers using a single matrix-array detector allowing the distance of objects in an observed scene to be estimated.

BACKGROUND

The cameras called light-field cameras provide this function. FIG. 1 shows the architecture of such a camera. In the various figures, the following conventions have been adopted, the optics have been represented by thick lines and the light rays by thin lines. It essentially includes an objective 1, a matrix array 2 of micro-lenses 20 and a matrix-array detector 3. The objective 1 includes an output pupil 4. It operates as follows. The image of an object plane 5 is formed by means of the objective 1 in an intermediate plane 6. Each object point $M_i$ therefore has an image $M_i'$ in the intermediate plane. This intermediate plane is placed in front of the matrix array 2 of micro-lenses 20 so that the image of this plane, i.e. the image given by the micro-lenses 20, is formed in the plane of the matrix-array detector 3. Thus, depending on the aperture of the objective and the position of the image $M_i'$, a certain number of micro-lenses 20 form from this image $M_i'$ a mosaic of images $M_{ij}''$ in the plane of the detector. For example, in FIG. 1, the point $M_0$ has as intermediate image the point $M_0'$ which gives as images on the detector the three points $M''_{01}$, $M''_{02}$ and $M''_{03}$ and the point $M_1$ has as intermediate image the point $M_1'$ which gives as images on the detector the triplet of points $M''_{11}$, $M''_{12}$ and $M''_{13}$. The position of the various images $M_{ij}''$ on the detector allows both the position of the object point $M_i$ and its distance to the objective to be determined.

For additional information on light-field cameras, the reader is referred to the applications of references U.S. Pat. No. 7,962,033 entitled "Methods and Apparatus for Full-Resolution Light-Field Capture and Rendering" and US2013/0308035 entitled "Image Pickup Apparatus". The reader is also referred to the publications entitled "The Focused Plenoptic Camera", A. Lumdaine and T. Gerogiev and "Single Lens 3D-Camera with Extended Depth-of-Field", C. Perwaß and L. Wietzke. Regarding methods for estimating the distance of objects in an imaged scene using one or more optical systems, mention may be made of the publication entitled "Depth resolution in three-dimensional images", Jung-Young Son, Oleksii Chernyshov, Chun-Hae Lee, Min-Chul Park and Sumio Yano, Opt. Soc. Am. A/Vol. 30, No. 5/May 20.

It is clear that it is sought to obtain with this type of camera the best possible resolution both in a given object plane and depthwise. However, with known methods, an increase in depth resolution is always accompanied by a loss of spatial resolution. In addition, the distance range in which it is possible to estimate the distance of observed objects is set and defined by the parameters of the chosen objective. FIG. 2 illustrates this problem. It shows the uncertainty I in an estimated distance $D_E$ as a function of said estimated distance for an objective of given focal length. Thus, to an estimated distance of 200 meters corresponds a measurement uncertainty of about 15 meters, this possibly being high. This uncertainty is related to the precision of the image-processing method, i.e. the capacity to estimate sub-pixel-sized offsets between various images of a given point. The curve of FIG. 2 is drawn for a capacity to estimate these offsets to within one tenth of a pixel, this corresponding to a quite common value. The limits $B_{INF}$ and $B_{SUP}$ of the curve represent the depth of field of the camera for this focal length of the objective. In the present case, the depth of field is comprised between 30 meters and 300 meters. It is possible to choose larger limits, for example by changing the criterion of clearness for the calculation of the depth of field, or to change them by applying a defocus for a given objective focal-length value but the uncertainty remains high for certain distance ranges.

To mitigate this drawback, various approaches have been explored. Thus, patent EP 2 244 484 entitled "Digital imaging method for synthetizing an image using data recorded with a plenoptic camera" implements micro-lenses of variable focal length. This approach is also addressed in the publication by the company Raytrix entitled "Single Lens 3D-Camera with Extended Depth-of-Field, C. Perwaß and L. Wietzke". More recently, the publication entitled "An electrically tunable plenoptic camera using a liquid crystal microlens array", Review of Scientific Instruments 86, 053101 (2015) presents a light-field camera integrating a matrix array of micro-lenses of electrically controllable focal length. The drawback of these various approaches is that they require matrix arrays of sophisticated micro-lenses.

SUMMARY OF THE INVENTION

The optical system according to the invention does not have these drawbacks and employs a matrix array of simple and identical micro-lenses. It is based on the following analysis.

If focal length is changed, the preceding curve varies. Thus, FIG. 3 shows the uncertainty I in an estimated distance $D_E$ as a function of said estimated distance for objectives of various focal lengths that are referenced 11 to 19. To give an order of magnitude, the focal lengths are comprised between 30 and 200 millimeters. For an object located at a given distance, there is then an optimal focal length that gives a minimum measurement uncertainty. For example, for 50 meters, the optical objective is the objective 18 and the measurement uncertainty with this objective does not exceed 1 meter. Thus, it is possible to determine for each objective the distance range for which the measurement uncertainty is minimal. With the preceding objectives, the ranges indicated in FIG. 4 are obtained. For the sake of clarity, the shortest focal lengths of the objectives 11, 12 and 13 are not shown in this figure, the ranges being very close together. By no longer using one optic but a series of optics of different focal length, it is possible to significantly decrease measurement uncertainty. Of course, it is not possible to continuously change objective. The proposed solution is therefore to use as objective a zoom, i.e. an objective of variable focal length, that operates continuously or discretely in order to allow the precisest possible estimation of the distance of the objects in the scene by acting on focal length.

More precisely, the subject of the invention is an optical system including an objective of the zoom type and a depth-estimating optical detecting unit, said depth-estimating optical detecting unit including a matrix array of micro-lenses and a matrix-array detector, the matrix array of micro-lenses being arranged so that the image of the focal plane of the zoom is focused by the matrix array of micro-lenses on the plane of the matrix-array detector, characterized in that said optical system includes means for calculating, for a first focal length of the zoom and for a given object, the estimated distance of this object and the measurement uncertainty in this estimation, depending on said first focal length and said estimated distance and, this estimated distance being known, optimizing means allowing at least one second focal length of the zoom to which a lower measurement uncertainty in this estimation corresponds to be determined.

Advantageously, the optimizing means include a loop of iterations allowing an optimal focal length to which the minimum measurement uncertainty in said estimation corresponds to be determined, each iteration including at least one change of focal length, and the estimated distance corresponding to the new focal length and the measurement uncertainty in this estimation to be calculated.

Advantageously, the loop of iterations is carried out in a constant zoom focal plane or in a variable zoom focal plane.

Advantageously, the loop of iterations is carried out at constant or variable zoom aperture.

Advantageously, the zoom is a zoom of continuously variable focal length or the zoom is a multi-focal objective.

Advantageously, the depth-estimating optical detecting unit is an infrared detecting unit.

BRIEF DESCRIPTION OF THE DRAWINGS

The invention will be better understood and other advantages will become apparent on reading the following non-limiting description and by virtue of the appended figures, in which.

DETAILED DESCRIPTION

The subject of the invention is an optical system including an objective of the zoom type and a depth-estimating optical detecting unit, said depth-estimating optical detecting unit including a matrix array of micro-lenses and a matrix-array detector, the matrix array of micro-lenses being arranged so that the image of the focal plane of the zoom is focused by the matrix array of micro-lenses on the plane of the matrix-array detector.

To ensure depth is correctly estimated, it is necessary to know the distortion and field curvature of the zoom for various focal-length values of this zoom.

There are two categories of zoom. On the one hand there are zooms of continuously variable focal length and on the other hand the zooms known as multi-focal objectives. The invention applies to both of these categories.

Figure 1:
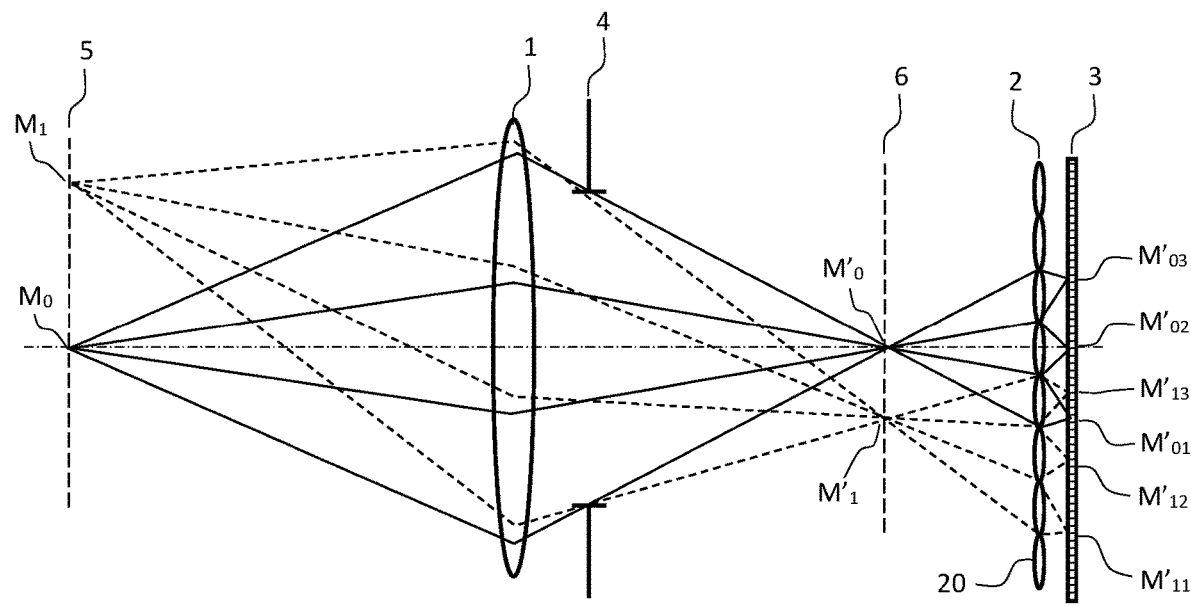
FIG. 1 shows a fixed-focal-length light-field camera according to the prior art.
Figure 2:
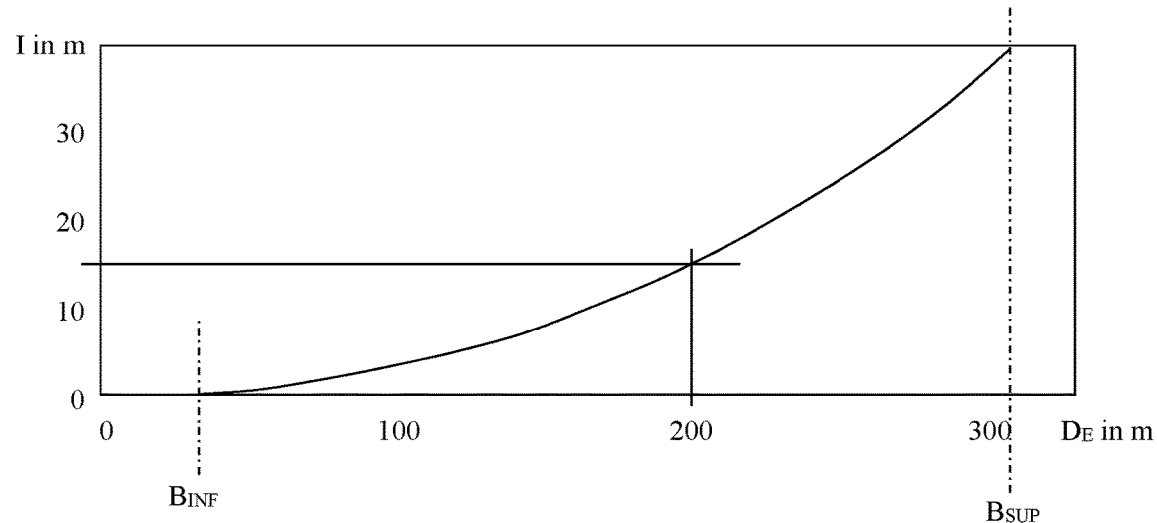
FIG. 2 shows the measurement uncertainty in an estimated distance as a function of the distance for a known fixed-focal-length light-field camera.
Figure 3:
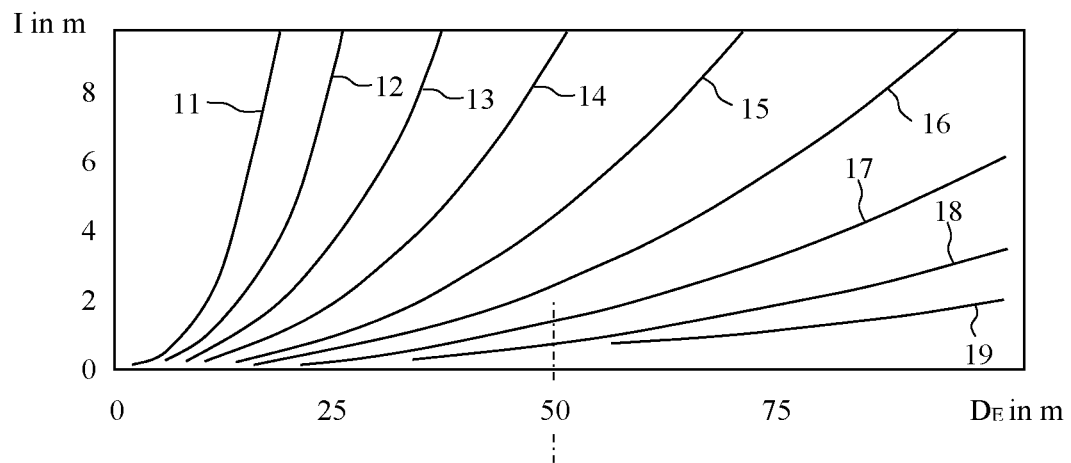
FIG. 3 shows the measurement uncertainty in an estimated distance as a function of the distance for a light-field camera including objectives of increasing focal length.
Figure 4:
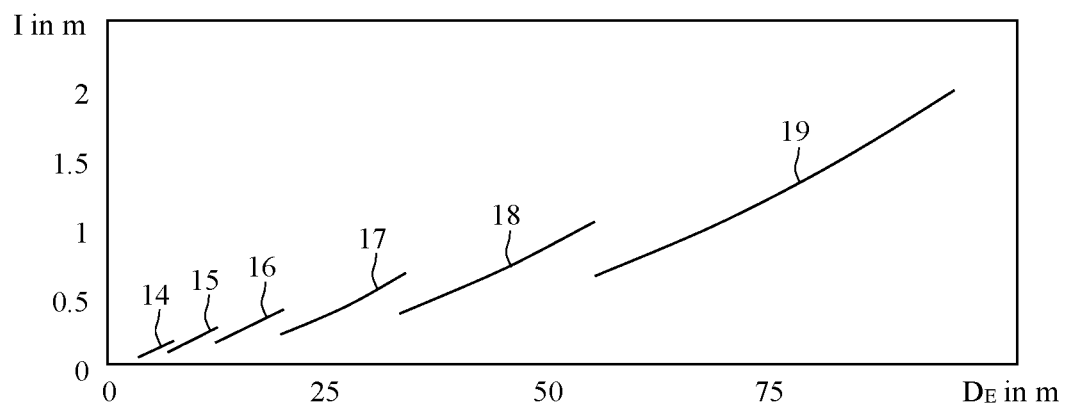
FIG. 4 shows, for each preceding objectives, the minimum measurement-uncertainty range as a function of distance.
Figure 5:
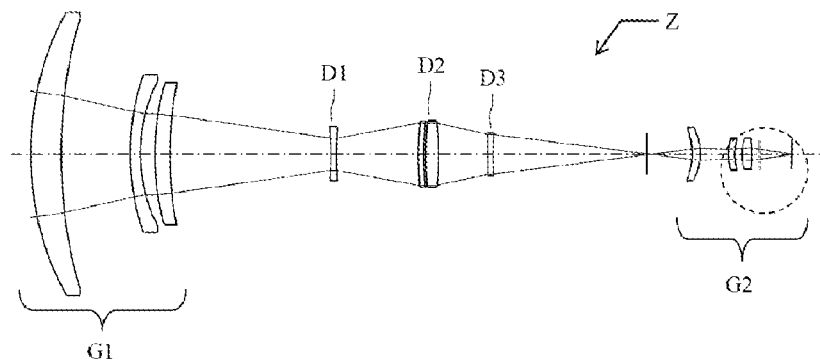
FIGS. 5 and 6 show a light-field zoom according to the invention in two extreme focal-length configurations.
Figure 6:
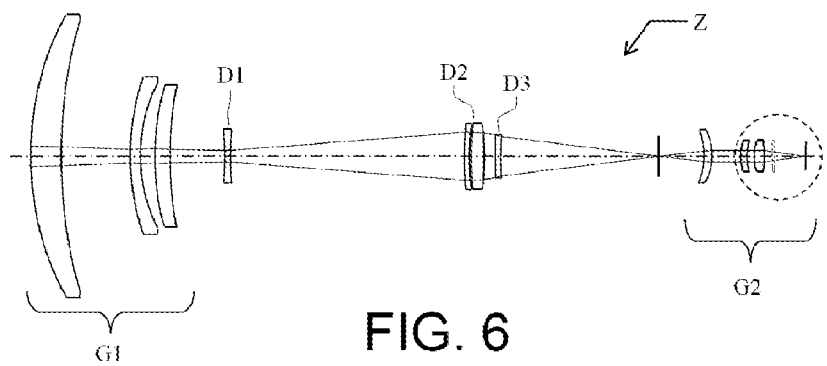
Figure 7:
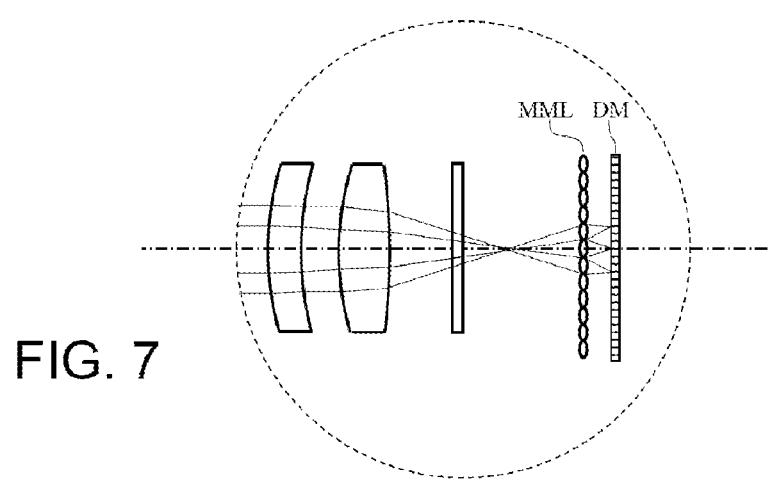
FIG. 7 shows an enlarged view of the receiving portion of the preceding light-field zoom.

By way of example, FIGS. 5 and 6 show a light-field zoom Z according to the invention in two extreme focal-length configurations. FIG. 7 shows an enlarged view of the receiving portion of the preceding light-field zoom.

This zoom Z includes two groups of fixed lenses referenced G1 and G2 and three groups of movable lenses D1, D2 and D3. Moving these three groups of lenses in a given way allows both the focal length of the zoom to be modified and the focus on its focal plane to be preserved. Thus, FIG. 5 shows the zoom in a long-focal-length configuration and FIG. 6 the zoom in a short-focal-length configuration. The focal-length ratio is about 7 in the case of this zoom. Other zoom configurations are possible.

Since the zoom according to the invention is a light-field zoom, it includes, where in a conventional zoom the detector is located, a depth-estimating optical detecting unit, said depth-estimating optical detecting unit including a matrix array of micro-lenses MML and a matrix-array detector DM as may be seen in FIG. 7 which shows an enlarged view of the encircled portion of the preceding FIGS. 5 and 6.

Figure 8:
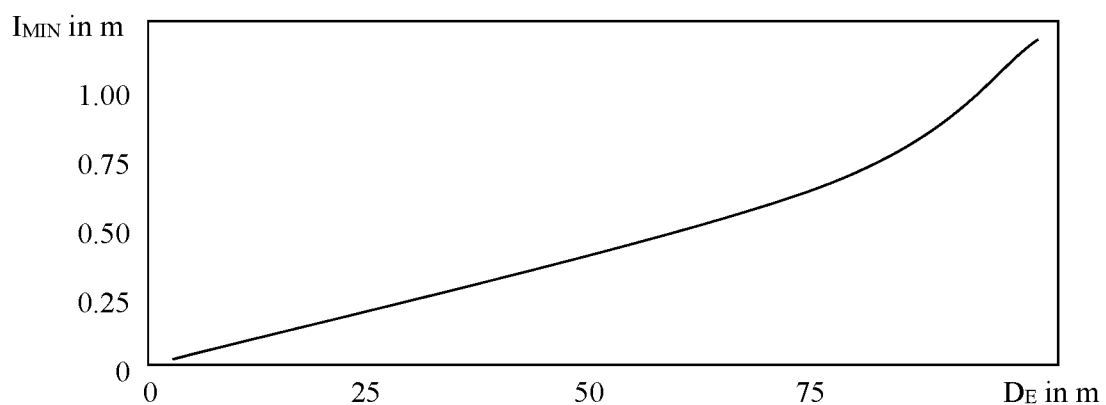
FIG. 8 shows, for a light-field zoom of continuously variable focal length, the minimum measurement uncertainty as a function of the estimated distance.

As was described above, there is, for each estimated distance, a focal length of the zoom that gives a minimum measurement uncertainty $I_{MIN}$. This minimum measurement uncertainty as a function of the estimated distance $D_E$ is shown in FIG. 8. This uncertainty depends on the field-depth limits of the optical system. In this curve, the measurement uncertainty does not exceed 1 meter at 100 meters of distance. The focal length of the zoom changes along this curve. In the case of FIG. 8, the focal length varies by a factor of 8 between the bottom of the curve and the top of the curve. The zoom necessarily has a maximum focal length. Therefore, this curve has a linear aspect provided that it is possible to increase the focal length of the objective. When the focal length reaches its maximum value, the variation becomes greater.

When the user takes a measurement, he does not know, a priori, the distance to be estimated and therefore, he cannot know, beforehand, the focal length of the zoom giving the lowest uncertainty in the measurement of this distance. Thus, the optical system includes:

means for calculating, for a first focal length of the zoom and for a given object, the estimated distance of this object and the measurement uncertainty in this estimation, depending on said first focal length and said estimated distance and, this estimated distance being known, optimizing means allowing at least one second focal length of the zoom to which a lower measurement uncertainty in this estimation corresponds to be determined.

The means for calculating estimated distance and the measurement uncertainty in this distance employ conventional methods used in light-field cameras, the focal length of the zoom and its aperture being known.

The chosen first focal length may, by way of example, be the smallest focal length of the zoom or its largest focal length or an intermediate focal length. It is possible, this choice of focal length being arbitrary, for the object the distance of which it is sought to measure not to be in the field-depth interval of the adopted focal length; in this case, the measurement is restarted with a larger or smaller focal length depending on the case in hand until a first distance evaluation is obtained in order to initiate the distance-estimating optimization process.

There are various techniques that allow the measurement to be optimized. By way of example, the optimizing means include a loop of iterations allowing an optimal focal length to which the minimum measurement uncertainty in said estimation corresponds to be determined, each iteration including at least one change of focal length, and the estimated distance corresponding to the new focal length and the measurement uncertainty in this estimation to be calculated. It is thus possible to rapidly converge on the optimal focal length. This process may be automated, the optimizing means automatically adjusting the focal length of the zoom to obtain the desired precision.

This loop of iterations may be carried out in a constant zoom focal plane. It is also possible, so as to change the limits of the distances accessible to the zoom, to apply a known defocus and to restart the iteration process with the new limits thus defined.

It is also possible to work at constant zoom aperture so as to facilitate the distance calculation in the loop of iterations. In this case, for a point located in the object field, the number of micro-lenses employed in the measurement remains constant. It is also possible to work at variable zoom aperture so as to improve the measurement uncertainty. In this case, for a point located in the object field, the number of micro-lenses employed in the measurement increases with the aperture.

The invention claimed is:

1. An optical system including an objective of a zoom type and a depth-estimating optical detecting unit, said depth-estimating optical detecting unit including a matrix array of micro-lenses and a matrix-array detector, the matrix array of micro-lenses being arranged so that an image of a focal plane is focused by the matrix array of micro-lenses on the plane of the matrix-array detector,
   wherein said optical system is configured to calculate at least:
      for a first focal length of a first zoom and for a given object, the distance of the object being in the field-depth interval of the first focal length, a first estimated distance of this object and a measurement uncertainty in this estimation, the measurement uncertainty being a distance as a function of said first focal length and said first estimated distance, and
      for a second focal length of a second zoom and for the same given object, the distance of the object being in the field-depth interval of the second focal length, a second estimated distance of this object and a second measurement uncertainty in this second estimation, the second measurement uncertainty being a second distance as a function of said second focal length and said second estimated distance of the object, a best estimated distance being the one that gives the smallest measurement uncertainty, and
   wherein the image of the focal plane is focused by the matrix array of micro-lenses on the plane of the matrix-array detector based on the best estimated distance.

2. The optical system as claimed in claim 1, wherein the optical system is further configured to calculate a loop of iterations allowing an optimal focal length to which a minimum measurement uncertainty in said estimation corresponds to be determined, each iteration including at least one change of focal length, and the estimated distance corresponding to a new focal length and the measurement uncertainty in this estimation to be calculated.

3. The optical system as claimed in claim 2, wherein the loop of iterations is carried out in a constant zoom focal plane.

4. The optical system as claimed in claim 2, wherein the loop of iterations is carried out in a variable zoom focal plane.

5. The optical system as claimed in claim 2, wherein the loop of iterations is carried out at constant zoom aperture.

6. The optical system as claimed in claim 2, wherein the loop of iterations is carried out at variable zoom aperture.

7. The optical system as claimed in claim 1, wherein the first and the second zooms are continuously variable focal lengths.

8. The optical system as claimed in claim 1, wherein the first and the second zooms are multi-focal objectives.

9. The optical system as claimed in claim 1, wherein the depth-estimating optical detecting unit is an infrared detecting unit.

* * * * *